United States Patent
Buschjohann et al.

(10) Patent No.: US 8,870,204 B2
(45) Date of Patent: Oct. 28, 2014

(54) AXLE MODULE, IN PARTICULAR TWIST-BEAM REAR AXLE

(75) Inventors: Thomas Buschjohann, Nordstemmen (DE); Heik Lachmund, Holle (DE); Enrico Schaller, Plauen (DE); Benjamin Hoelig, Plauen (DE); Andreas Kiesel, Thalheim (DE)

(73) Assignee: KSM Castings Group GmbH, Hildesheim (DE)

( * ) Notice: Subject to any disclaimer, the term of this patent is extended or adjusted under 35 U.S.C. 154(b) by 0 days.

(21) Appl. No.: 13/699,901

(22) PCT Filed: May 27, 2011

(86) PCT No.: PCT/DE2011/001157
§ 371 (c)(1),
(2), (4) Date: Dec. 24, 2012

(87) PCT Pub. No.: WO2011/147411
PCT Pub. Date: Dec. 1, 2011

(65) Prior Publication Data
US 2013/0093156 A1    Apr. 18, 2013

(30) Foreign Application Priority Data

May 27, 2010 (DE) .......................... 10 2010 021 674
May 26, 2011 (DE) .......................... 10 2011 103 093

(51) Int. Cl.
*B60G 3/12* (2006.01)
(52) U.S. Cl.
USPC .................................................. 280/124.128
(58) Field of Classification Search
USPC ............... 280/124.128, 124.129, 124.13, 280/124.132, 124.107, 124.116
See application file for complete search history.

(56) References Cited

U.S. PATENT DOCUMENTS

| | | | |
|---|---|---|---|
| 8,046,893 B2 | 11/2011 | Criqui et al. | |
| 2005/0173882 A1* | 8/2005 | Drabon et al. | 280/124.107 |

FOREIGN PATENT DOCUMENTS

| | | | |
|---|---|---|---|
| DE | 34 47 036 | | 7/1986 |
| DE | 195 35 521 | | 4/1996 |
| DE | 19752347 | A1 * | 6/1998 |
| EP | 0 774 369 | | 5/1997 |
| EP | 1 036 680 | | 9/2000 |
| EP | 2 078 870 | | 7/2009 |
| FR | 2 888 559 | | 1/2007 |
| WO | WO 2008/055958 | | 5/2008 |
| WO | WO 2008/095286 | | 8/2008 |

OTHER PUBLICATIONS

International Search Report of PCT/DE2011/001157, date of mailing Mar. 23, 2012.
International Preliminary Report on Patentability of PCT/DE2011/001157 with Written Opinion of the International Searching Authority, Nov. 27, 2012.
Fahrenwaldt, Hans J./Schuler, Volkmar: Praxiswissen Schweisstechnik [Practical Knowledge of Welding Technology], Berlin—Heidelberg, 2$^{nd}$ revised and expanded edition, 2008, p. 127-131. Spec., p. 4.

* cited by examiner

*Primary Examiner* — Faye M. Fleming
(74) *Attorney, Agent, or Firm* — Collard & Roe, P.C.

(57) ABSTRACT

The invention relates to an axle module for a motor vehicle. The axle module is made up of two control arms which can be attached to the vehicle chassis, carry the wheels of the axle, and are connected with one another by way of an axle body. The connection between axle body and the respective control arm is an adhesive connection.

33 Claims, 16 Drawing Sheets

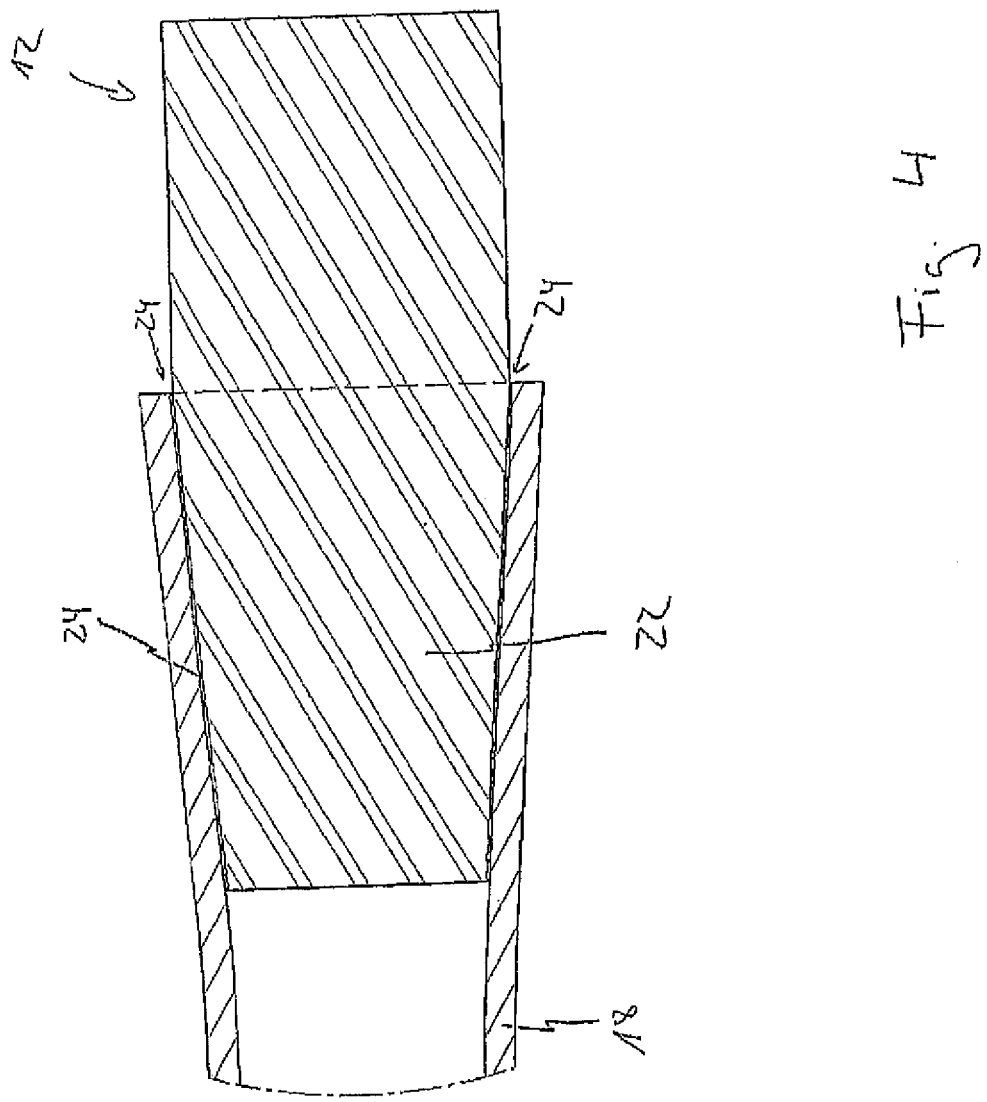

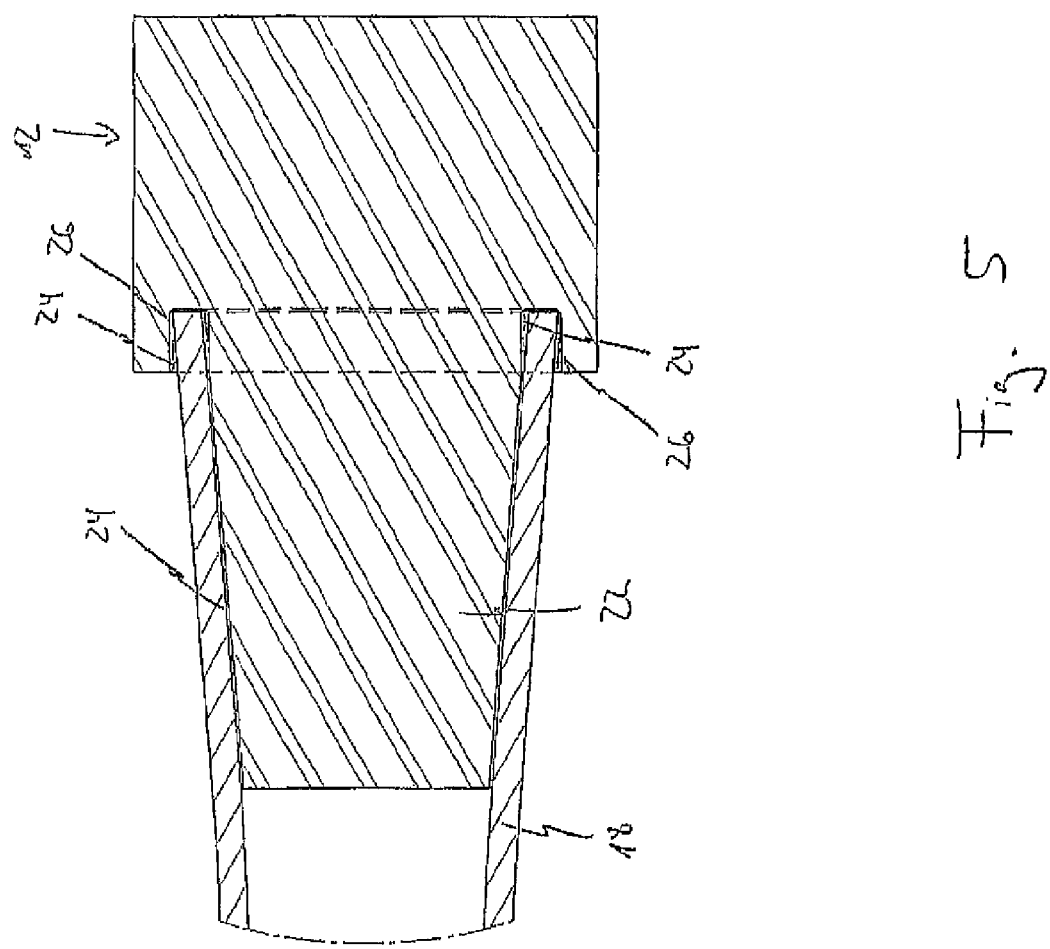

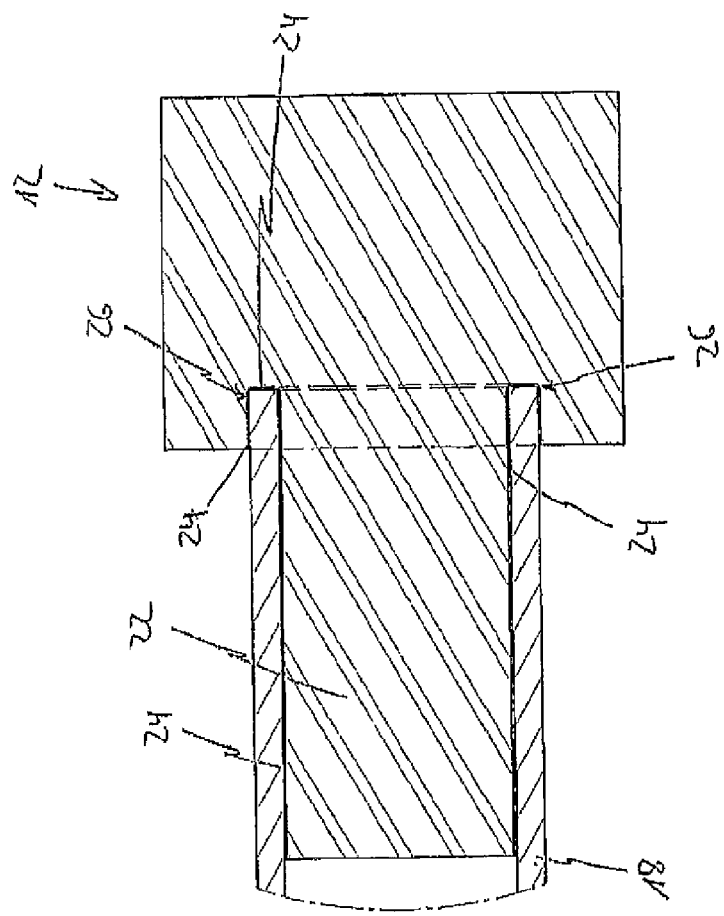

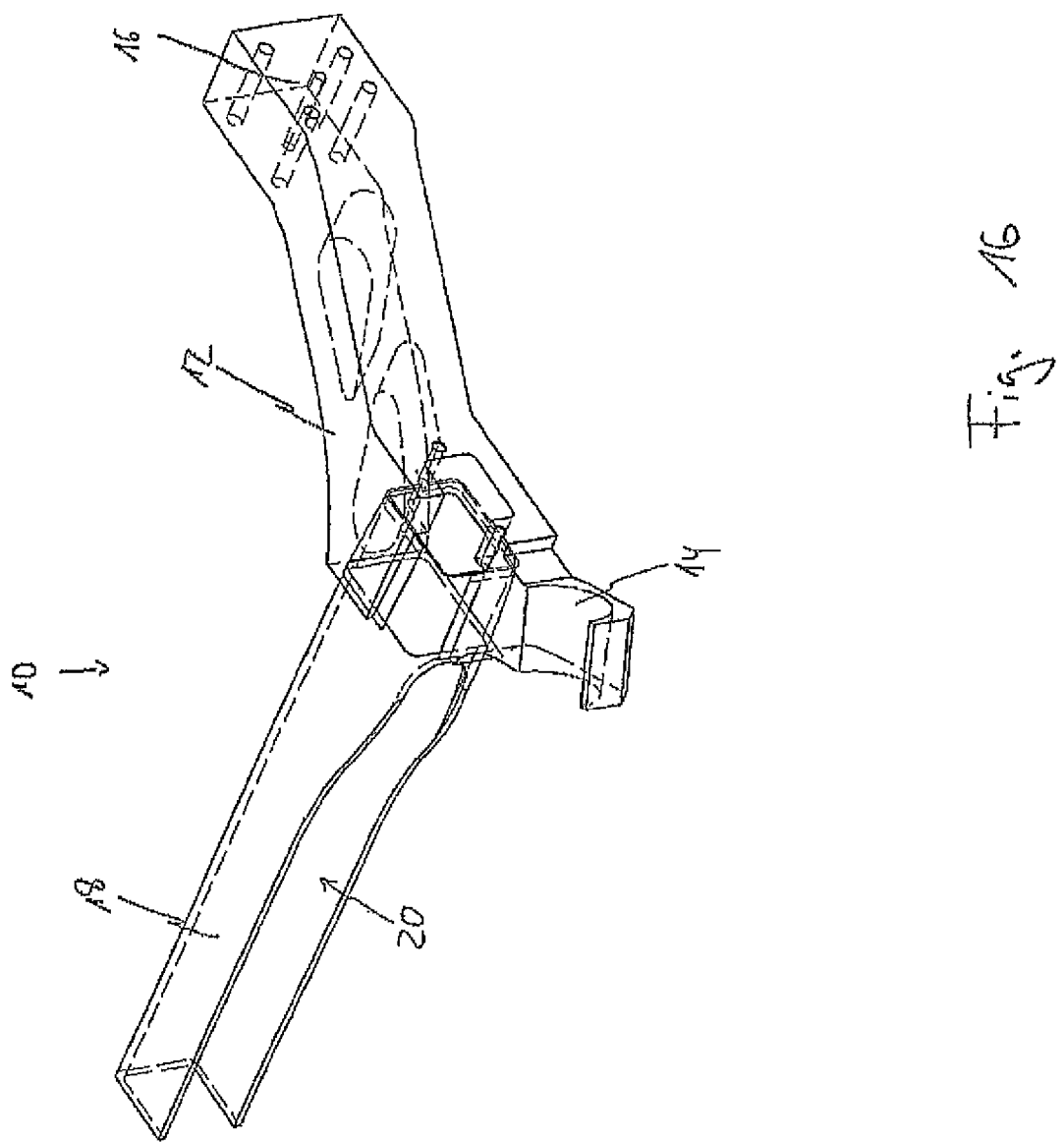

AXLE MODULE, IN PARTICULAR TWIST-BEAM REAR AXLE

CROSS REFERENCE TO RELATED APPLICATIONS

Figure 1:
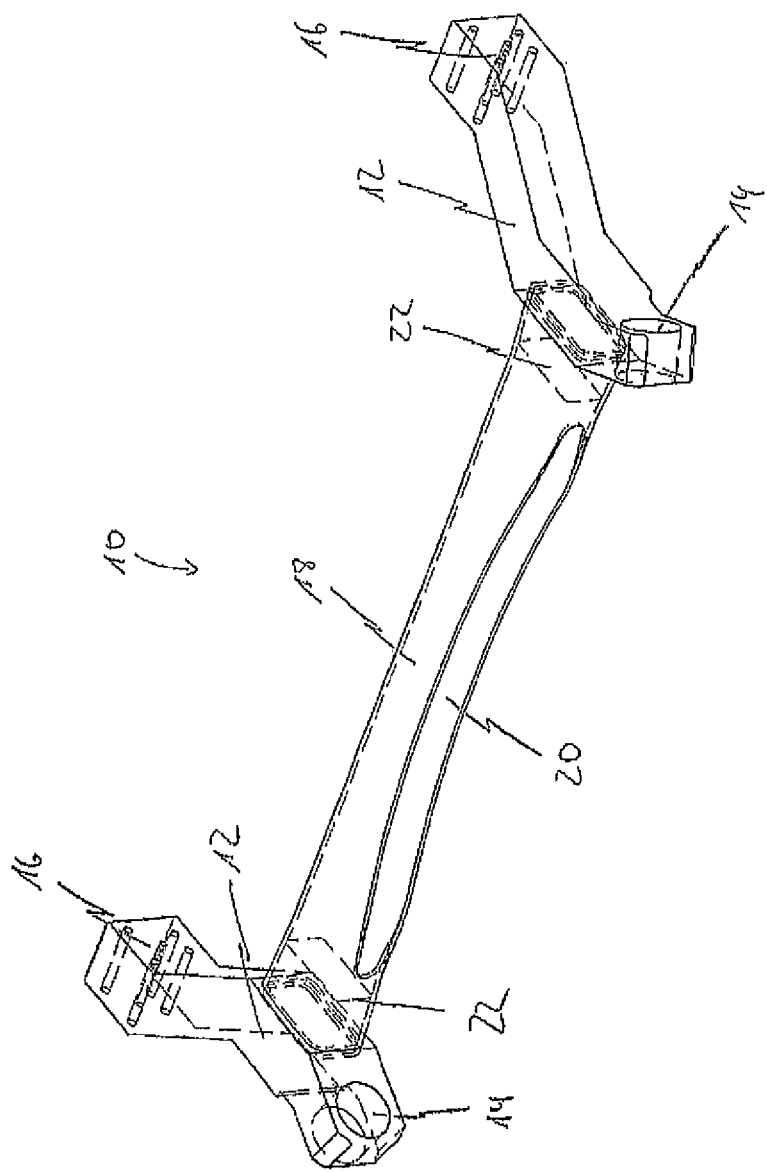

This application is the National Stage of PCT/DE2011/001157 filed on May 27, 2011, which claims priority under 35 U.S.C. §119 of German Application Nos. 10 2010 021 674.7 filed on May 27, 2010 and 10 2011 103 093.3 filed on May 26, 2011, the disclosures of which are incorporated by reference. The international application under PCT article 21(2) was not published in English.

The invention relates to an axle module, particularly a twist-beam axle, for a motor vehicle.

Twist-beam axles, such as they are disclosed, in general, in DE 195 35 521 A1, for example, currently represent the usual rear axles for front-wheel drive cars and usually consist of two control arms, particularly trailing arms, which carry the wheels or are connected with them, and an axle body, particularly a transverse profile, which connects the two control arms.

The invention is based on the task of further developing an axle module in such a manner that the axle module demonstrates improved driving dynamics properties and improved comfort and acoustics properties. The invention is furthermore based on the task of making an axle module of the type stated initially less sensitive to corrosion, easier to process, and possible to produce in more cost-advantageous and simple manner. Furthermore, an axle module of the type stated initially is to be developed further in such a manner that the weight is reduced, while the ability to withstand stress is greater, at the same time. Furthermore, a more compact and more stable overall construction of the axle module is supposed to be obtained.

According to the invention, this task is accomplished with an axle module for a motor vehicle, which consists of two control arms, preferably trailing arms, which can particularly be attached to the vehicle chassis by way of a pivot bearing, carry the wheels of the axle, and which are connected with one another by way of an axle body, preferably a transverse support, particularly a transverse profile, whereby the connection between axle body and the control arm, in each instance, is an adhesive connection.

Such an axle module is characterized, in advantageous manner, in that the control arms are relatively movement-independent of the axle body, because of the adhesive connection, when the axle module is subject to dynamic stress. As a result, the driving dynamics properties as well as the comfort and acoustics properties of the motor vehicle are improved. Furthermore, the production of the axle module, particularly the connection between axle body and the control arm, in each instance, can be produced in particularly cost-advantageous and simple manner.

In this connection, it can be advantageous if the adhesive connection is formed by means of an adhesive that is and preferably remains flexible or elastic after hardening, in such a manner that the control arms are relatively movement-independent of the axle body in the case of dynamic stress of the axle module, in a desired, predetermined manner.

It can furthermore be advantageous if the adhesive connection is the only, preferably material-fit connection between the control arm, in each instance, and the axle body.

A material-fit connection is a connection in which the components, here the control arm and the end region of the axle body, in each instance, are so intimately connected with one another that the forces that occur during operation are transferred by means of cohesion and adhesion.

For certain cases of use, it can be advantageous if the end region of the axle body, in each instance, is additionally connected with the control arm, in each instance, with shape fit, at least in part, particularly to form an anti-twist mechanism and/or a predetermined load distribution.

For certain applications, it can be advantageous if the end region of the axle body, in each instance, is additionally connected with the control arm, in each instance, with force fit, at least in part, particularly to form an anti-twist mechanism and/or a predetermined load distribution.

For some cases of use, it can be advantageous if the end region of the axle body, in each instance, is additionally connected with the control arm, in each instance, at least in part, by means of crimping predetermined regions of the axle body and/or of the control arm, in each instance.

For specific cases of use, it can be advantageous if the end region of the axle body, in each instance, is additionally connected with the control arm, in each instance, at least in part, by means of clinching or, in particular, clinching. An overview of clinching or, in particular, clinching will be found by a person skilled in the art in Fahrenwaldt, Hans J./Schuler, Volkmar: Praxiswissen Schweißtechnik [Practical Knowledge of Welding Technology], Berlin-Heidelberg, $2^{nd}$ revised and expanded edition, 2008, p. 127-130.

For different cases of use, it can be practical if the end region of the axle body, in each instance, is additionally connected with the control arm, in each instance, at least in part, by means of riveting, particularly punch riveting.

For other cases of use, it can be practical if the end region of the axle body, in each instance, is additionally connected with the control arm, in each instance, at least in part, by means of screwing.

For even other cases of use, it can be practical if the end region of the axle body, in each instance, is additionally connected with the control arm, in each instance, at least in part, by means of clamping.

For yet other cases of use, it can be practical if the end region of the axle body, in each instance, is additionally connected with the control arm, in each instance, at least in part, by means of pressing.

In order to set predetermined tolerances and/or to produce or prepare an optimal connection between axle body and control arm, it can be practical if the connection regions or connection surfaces on the axle body and/or on the control arm, in each instance, are machined. In this connection, this can involve machining that removes material, particularly one that removes chips, which leads to a predetermined geometry, particularly a conical formation of the end regions of the axle body and/or the connection region in or on the control arm, in each instance. However, this can also involve machining that roughens the material of the connection regions or the connection surfaces, in order, for example, to increase the surface area for an optimized adhesive connection between axle body and the control arm, in each instance. In particular, it can be advantageous if the connection regions or the connection surfaces are machined by means of a combination of different machining methods.

It can be advantageous if the axle body is produced from a different material than the control arms. By means of the adhesive connection, control arm and axle body can be produced from the most varied materials, best suited for the purpose of use, in each instance, more or less without any consideration of the question of the ability to connect these materials.

In total, the weight can be reduced, with simultaneously improved ability of the axle module to withstand dynamic stress, if at least a part of the axle module, preferably the control arms, is produced at least in part from a light construction material. For specific application cases, a light metal can be advantageous as a light material. For other application cases, a plastic can be advantageous as a light material. For yet other application cases, a composite of light metal and plastic can be advantageous. Thus, in particular, a more compact overall construction of an axle module can be obtained.

The light metal can consist of aluminum, magnesium, zinc, or of alloys with one or more of these metals. For certain purposes of use, one or more parts of the axle module, particularly the axle body, can advantageously also consist of steel or iron, particularly of cast steel or iron. For specific purposes of use, a sheet-metal construction can be advantageous for one or more parts of the axle module, preferably for the axle body.

It can be advantageous if the plastic is a polyamide, particularly a fiberglass-reinforced polyamide. However, it can also be advantageous to use a plastic made of polypropylene, particularly fiberglass-reinforced polypropylene. For specific purposes of use, it can be advantageous if a plastic is used that is known under the designation Ultramid® A3WG10 CR.

It can be advantageous if each of the control arms has an accommodation provision, particularly an accommodation sleeve and/or an accommodation journal, for the axle body, whereby the axle body, depending on the application case, is either introduced into the sole accommodation sleeve that is present, with its end region, in each instance, for example pushed in, or affixed to the sole accommodation journal that is present, for example pushed on. For some application cases, however, it can also be practical if both an accommodation sleeve and an accommodation journal are present, and the axle body is both introduced into the accommodation sleeve with an end region, in each instance, and affixed to the accommodation journal. In this connection, the degree of introduction or application, in each instance, can be different. For example, the accommodation journal can be configured to be longer than the accommodation sleeve.

In the simplest case, the accommodation sleeve can advantageously be a recess or a hole in the control arm.

The accommodation sleeve can advantageously be open on one or both sides.

However, it can also be practical if the accommodation sleeve is configured as a groove that then more or less encloses at least a part of an accommodation journal. If an accommodation journal is present, an accommodation sleeve in the form of an accommodation groove that surrounds the accommodation journal having a predetermined depth can also advantageously form a contact surface for the axle body affixed to the accommodation journal with the end region, in each instance, so that positioning is simplified.

It can be practical if the accommodation journal is configured to be solid. In particular for weight optimization of the axle module and/or for optimization of the connection between axle body and control arm, in each instance, however, it can also be advantageous if the accommodation journal is configured to be hollow, at least in part, preferably as a hollow profile, and/or has recesses introduced on one side.

It can also be advantageous if the accommodation sleeve has recesses introduced on one side.

By means of the recesses introduced on one side, a shape-fit connection is additionally achieved in the case of an adhesive connection, if the adhesive is introduced into these recesses.

It can be practical if the accommodation sleeve and/or the accommodation journal have a cross-sectional shape that deviates from a circular shape, at least in part.

For some cases, it can be advantageous if the accommodation sleeve and/or the accommodation journal is configured to be essentially rectangular in cross-section. For certain cases, it can be advantageous if the accommodation sleeve and/or the accommodation journal are configured to be essentially square in cross-section. For specific cases, it can be advantageous if the accommodation sleeve and/or the accommodation journal is configured to be essentially oval in cross-section. For other cases, it can be advantageous if the accommodation sleeve and/or the accommodation journal is configured to be essentially triangular in cross-section. For some cases, it can be advantageous if the accommodation sleeve and/or the accommodation journal is configured to be essentially polygonal in cross-section. For special cases, it can be advantageous if the accommodation sleeve and/or the accommodation journal is configured to be essentially trapezoid in cross-section.

Such an accommodation provision, particularly an accommodation sleeve and/or accommodation journal, has the advantage that the axle body demonstrates not only the material-fit adhesive connection with the control arm, in each instance, but also a shape-fit connection with the control arm, in each instance, whereby the forces that essentially act on the axle module are passed on by way of the shape fit between control arm and axle body. It is advantageous that in this way, no shear forces act on the adhesive connection, but at most pressure forces, which do not impair the adhesive connection.

The configuration of the accommodation provision as an accommodation sleeve and/or accommodation journal furthermore has the advantage that the adhesive surface between control arm and axle body can be selected to be as large as necessary to achieve sufficient strength of the connection between the axle body and the control arm, in each instance. It is practical if, in this connection, the adhesive connection can be produced, at least in part, between the inner mantle of the accommodation sleeve and the outer mantle of the axle body accommodated by the accommodation sleeve and/or, at least in part, between the outer mantle of the accommodation journal and the inner mantle of the axle body accommodated by the accommodation journal, which mantle is configured, at least in this region, in tubular manner. In tubular manner means, in this and the following connection, that at least the end region of the axle body, in each instance, is configured as a hollow profile that is open on the face side, but can be open or closed over its circumference.

It can be particularly practical if the adhesive connection between the inner mantle of the accommodation sleeve and the outer mantle of the axle body accommodated by the accommodation sleeve and/or between the outer mantle of the accommodation journal and the inner mantle of the axle body accommodated by the accommodation journal, which mantle is configured, at least in this region, in tubular manner, is produced over the full area. In this way, the accommodation provision can particularly be configured to be relatively short, but the strength of the connection between the axle body and the control arm, in each instance, can also be increased.

The accommodation sleeve and/or the accommodation journal can be closed or at least partly open over their circumference. If the accommodation sleeve and/or the accommodation journal are closed over their circumference, more surface area for formation of an adhesive connection can be available. If the accommodation sleeve and/or the accommodation journal are at least partly open over their circumference, this can facilitate the introduction and/or application of the axle body and/or the introduction or application of the adhesive.

In order to prevent the formation of a galvanic element between control arm and axle body when using corresponding materials, it can be advantageous if the adhesive connection is of such a type that the adhesive acts as a spacer between the control arm, in each instance, and the axle body. In this way, the axle body is essentially uncoupled from the control arm, in each instance.

The accommodation provision can advantageously be an integral part of the control arm and then helps to form it or is integrated into it. In particular, it can be advantageous if the control arm is configured in one piece with at least a part of the accommodation provision. As a result, the control arm and the axle module are particularly stable, and can be produced in simple and cost-advantageous manner.

The accommodation provision itself is preferably configured in one or multiple parts.

It can be advantageous for certain cases of use if at least a part of the accommodation sleeve and/or of the accommodation journal is configured in tubular manner. For specific cases of use, it can be advantageous if at least a part of the accommodation sleeve and/or of the accommodation journal is configured in bucket-shaped manner. For other cases of use, it can be advantageous if at least a part of the accommodation sleeve and/or of the accommodation journal is configured in pot-shaped manner, and for yet other cases of use, it can be advantageous if at least a part of the accommodation sleeve and/or of the accommodation journal is configured in bell-shaped manner. Finally, for some cases of use, it can be advantageous if at least a part of the accommodation sleeve and/or of the accommodation journal is configured in conical manner.

In this connection, it can be advantageous if at least a part of the accommodation sleeve widens conically toward the axle body. In this connection, it can also be advantageous if at least a part of the accommodation sleeve and/or of the accommodation journal widens conically away from the axle body.

Axle body and control arm can advantageously form a hybrid light component composed of plastic and light metal. It can be advantageous if the control arms consist of plastic and the axle body consists of light metal, or vice versa.

It can be advantageous if the axle body is produced, at least in part, from a light material, preferably a light metal, from plastic or a composite of light metal and plastic.

It can be practical if the accommodation provision is integrated, at least in part, into the control arm. It can be particularly practical if the accommodation provision is formed, at least in part, by the control arm.

A particular advantage can consist in that the accommodation provision and/or the control arm has one or more reinforcement elements, particularly reinforcement ribs, belts, beads, bulges, crosspieces and/or perforations, but preferably multiple reinforcement ribs.

For some applications, it can be advantageous if the axle body is disposed at the level of the rotation axes of the wheels.

For other applications, it can be advantageous if the axle body is disposed between the rotation axes and the connection for attaching the control arms to the vehicle chassis. For yet other applications, it can be advantageous if the axle body is disposed at the level of the connection for attaching the control arm to the vehicle chassis.

Furthermore, it can be advantageous if at least a part of the accommodation provision is produced using a casting method. In particular, it can be advantageous if the control arm with the accommodation provision is produced as a component cast in one piece. It can be practical if the accommodation provision is a part produced separately from casting of the control arm, which is cast into or onto the control arm, at least in part.

It can also be advantageous if the accommodation provision, particularly the accommodation sleeve and/or the accommodation journal for the axle body, is adapted to the outer and/or inner contour of same, but at least to the outer and/or inner contour of the corresponding end regions of the axle body.

In advantageous manner, the control arm can furthermore have a shock absorber accommodation for attachment of a shock absorber between control arm and the vehicle chassis, which accommodation is connected in one piece with the control arm and preferably produced using a casting method.

It can be advantageous if the control arm furthermore has a spring contact surface or accommodation for accommodating a corresponding helical spring, which contact surface or accommodation is connected in one piece with the control arm and preferably produced using a casting method.

However, these individual accommodations disposed on the control arms of the axle module can also be attached to the control arms by means of screwing, welding, material removal, or the like, for specific purposes of use.

It can be particularly practical if at least a part of the accommodation provision or the cast component is produced by means of squeeze casting, counter-pressure ingot mold casting (CPC), die casting, particularly by means of thixo-casting, rheocasting, and low-pressure sand casting, or by means of gravity ingot mold casting.

It can be particularly advantageous and practical if the axle module is configured as a twist-beam axle.

The term twist-beam axle is a broad one. For specific purposes of use, this can advantageously be a so-called torsion-crank axle. For other purposes of use, this can advantageously be a so-called coupling-arm axle. For yet other cases of use, this can be a twist-beam axle in the narrower sense. One speaks of torsion-crank axles when the transverse connection, particularly the axle body, lies very close to the center of the wheel, and therefore demonstrates properties similar to a rigid axle. One speaks of a twist-beam axle in the narrower sense if the transverse connection, particularly the axle body, lies close to the trailing arm mounting and therefore demonstrates properties similar to a trailing-arm axle. One speaks of a coupling-arm axle if the transverse connection, particularly the axle body, is situated approximately in the front third of the trailing arms, and thereby combines advantages of trailing arm axles with twist-beam axles in the narrower sense.

It can be advantageous if the twist-beam axle comprises an axle body or transverse support oriented in the transverse vehicle direction, configured to be rigid for bending and soft for torsion, and two control arms, particularly trailing arms, oriented in the longitudinal vehicle direction, configured to be rigid for bending and torsion. It can be advantageous if their ends, which lie farthest forward when viewed in the longitudinal vehicle direction, are firmly connected with the axle body or transverse support, and if a wheel is mounted, in each instance, on their rearmost ends.

It can also be advantageous if the axle module is configured as a rigid axle, whereby the control arms then essentially form the wheel supports.

The control arms can preferably be produced using a casting method, together with at least a part of the accommodation provision. For specific purposes of use, it can also be practical if the control arms are produced from one or more injection-molded, extruded, continuously cast or cast profiles. For certain application cases, it can be advantageous if at least a part of the control arm and/or of the accommodation provision is produced from at least one injection-molded, extruded, continuously cast or cast profile.

The axle body can advantageously be configured as a T, V, or U profile, or as a tubular profile preferably having a pressed-in cross-section, in C shape. The latter shape ensures improved conditions in the connection region with the control arms or the trailing arms. The axle body can advantageously be produced from an injection-molded, extruded, continuously cast or cast profile.

The accommodation provision can advantageously be disposed on one end of the control arm. An accommodation, preferably in the form of a sleeve, can be disposed on the other end of the control arm, for attachment means for attaching the axle module to the vehicle chassis.

It can be advantageous if a connection element, preferably in the form of a tube or a rod, is disposed within the axle body, which element is connected, in its end regions, with the control arm, in each instance, preferably screwed onto it. It can be advantageous if the connection is such that the connection element is active as a tie rod that connects the two control arms. With such a tie rod, not only can the torsion rigidity of the axle body be adjusted, but also, simplified positioning of the axle body relative to the control arms can advantageously be achieved, which leads to an optimized adhesive connection.

Figure 2:
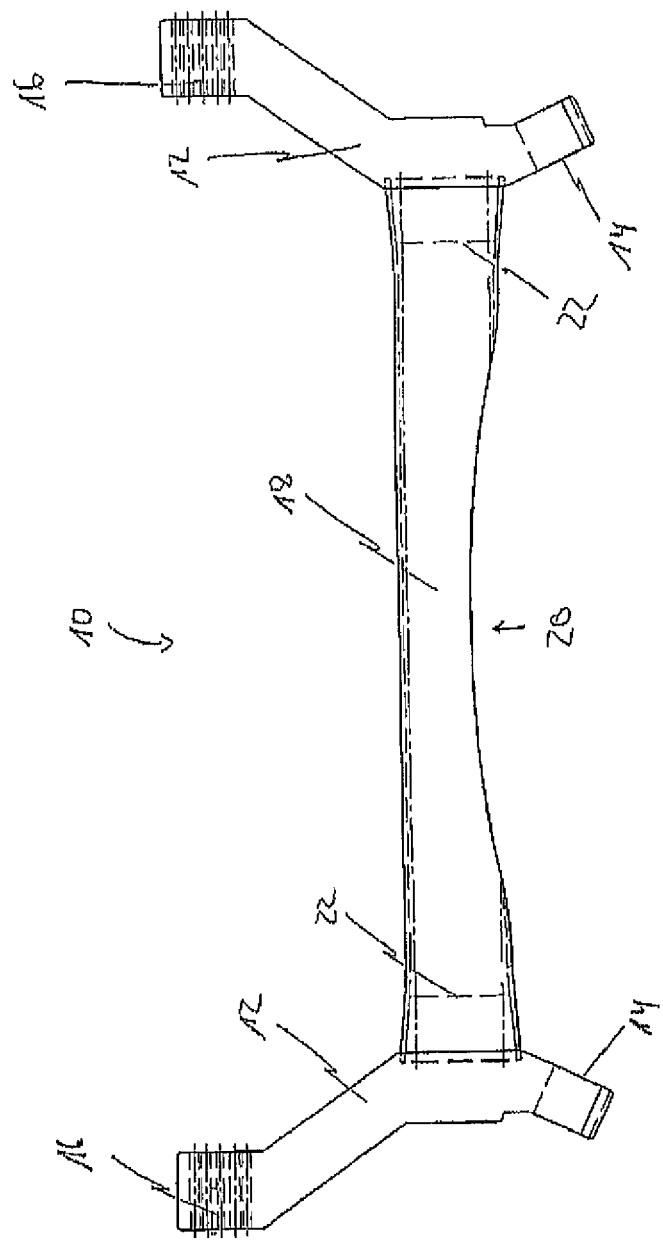
Figure 3:
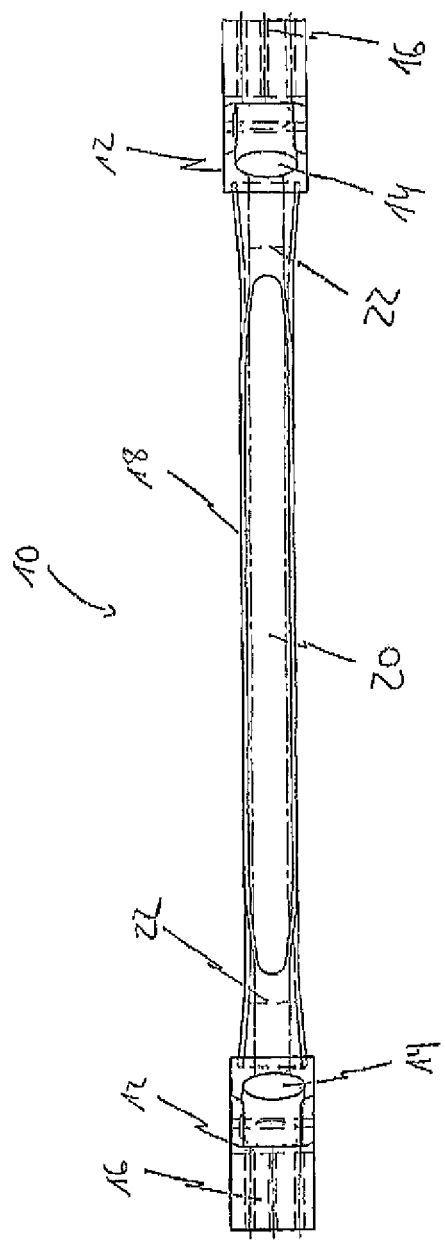
Figure 9:
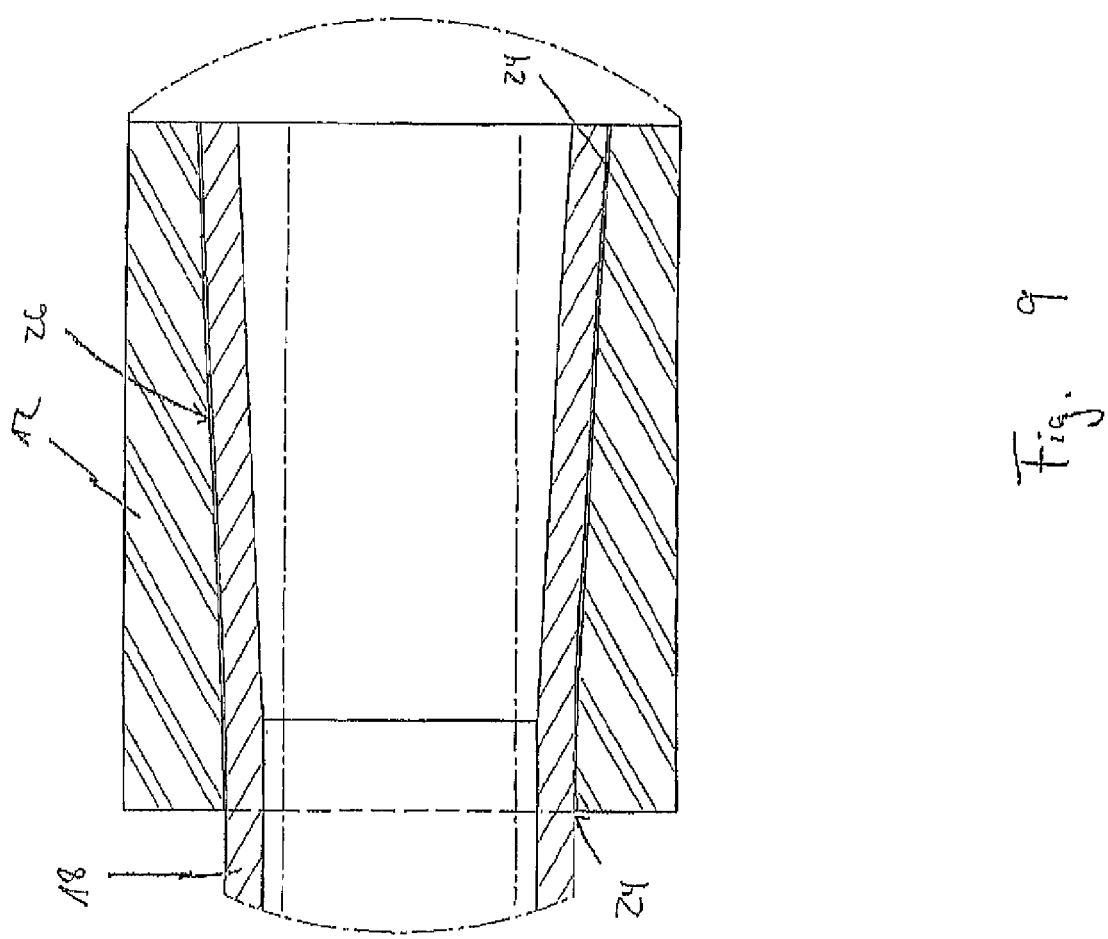
Figure 10:
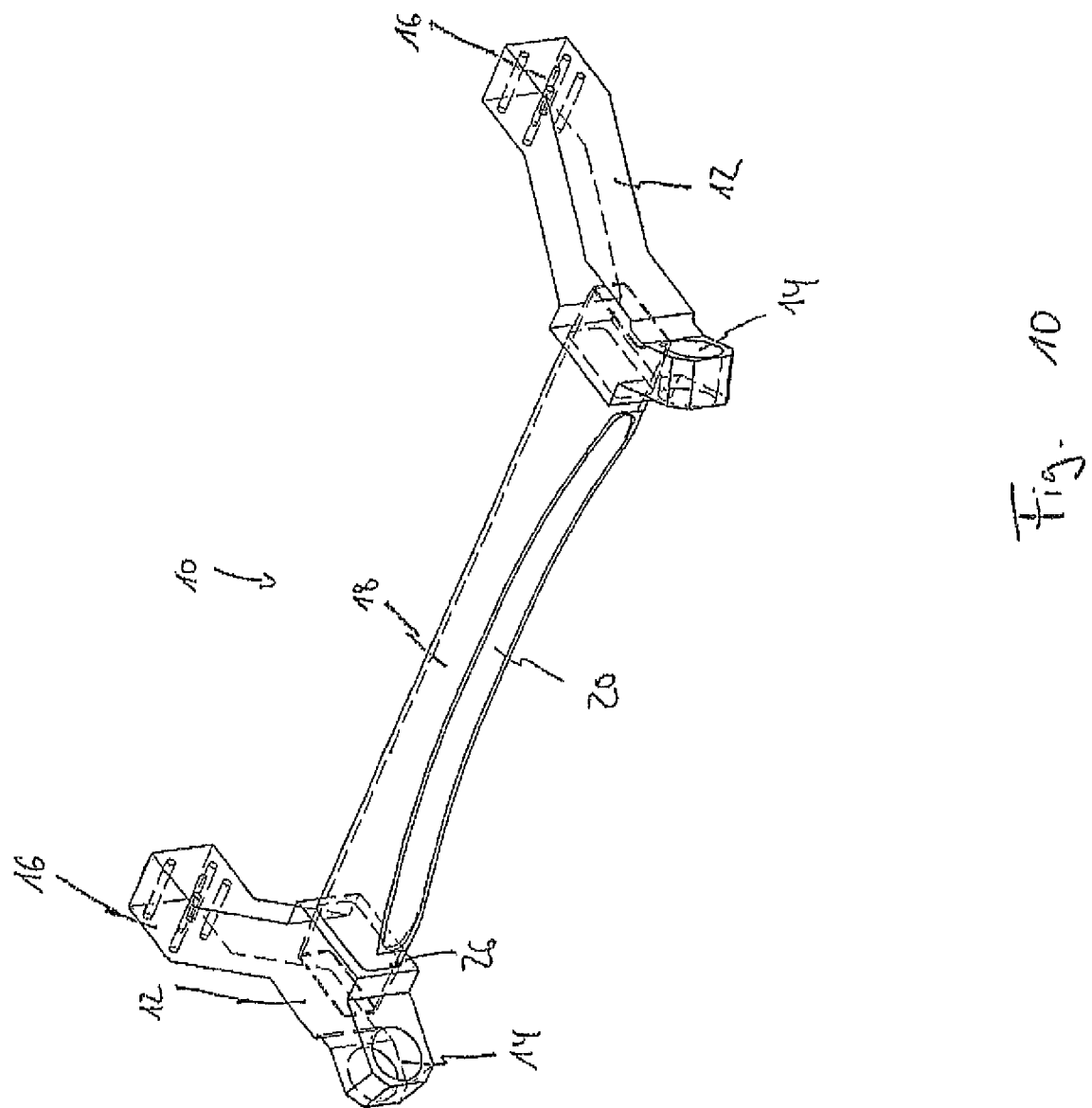
Figure 11:
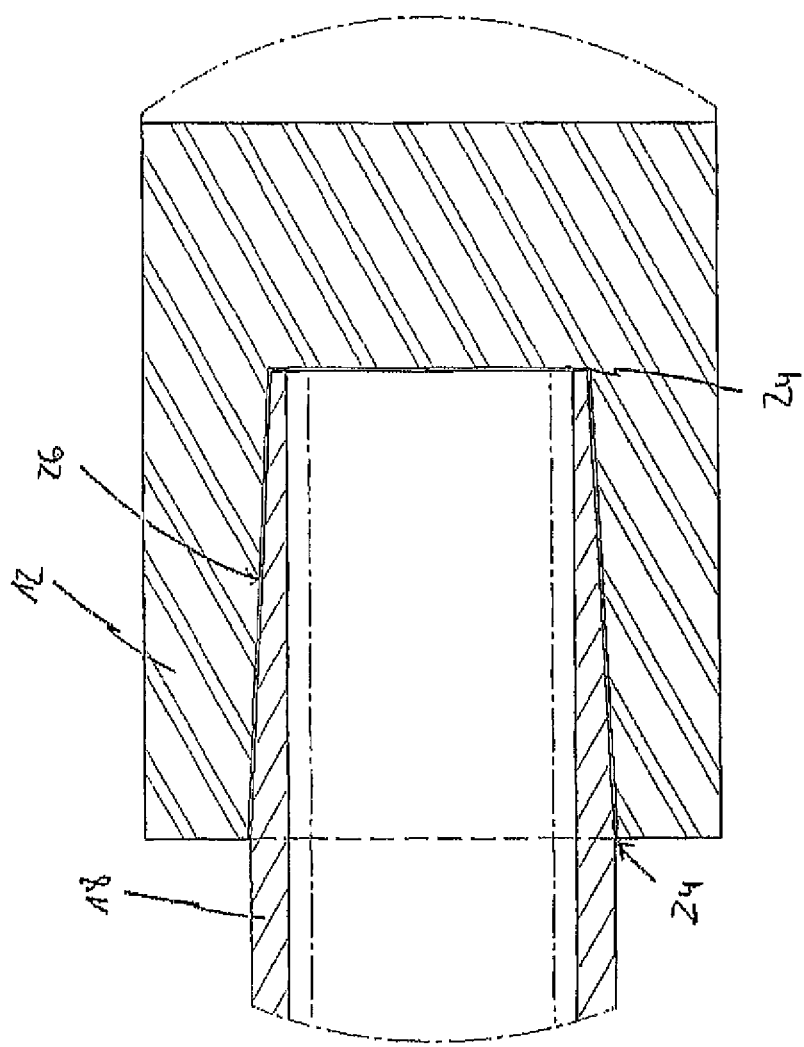
Figure 12:
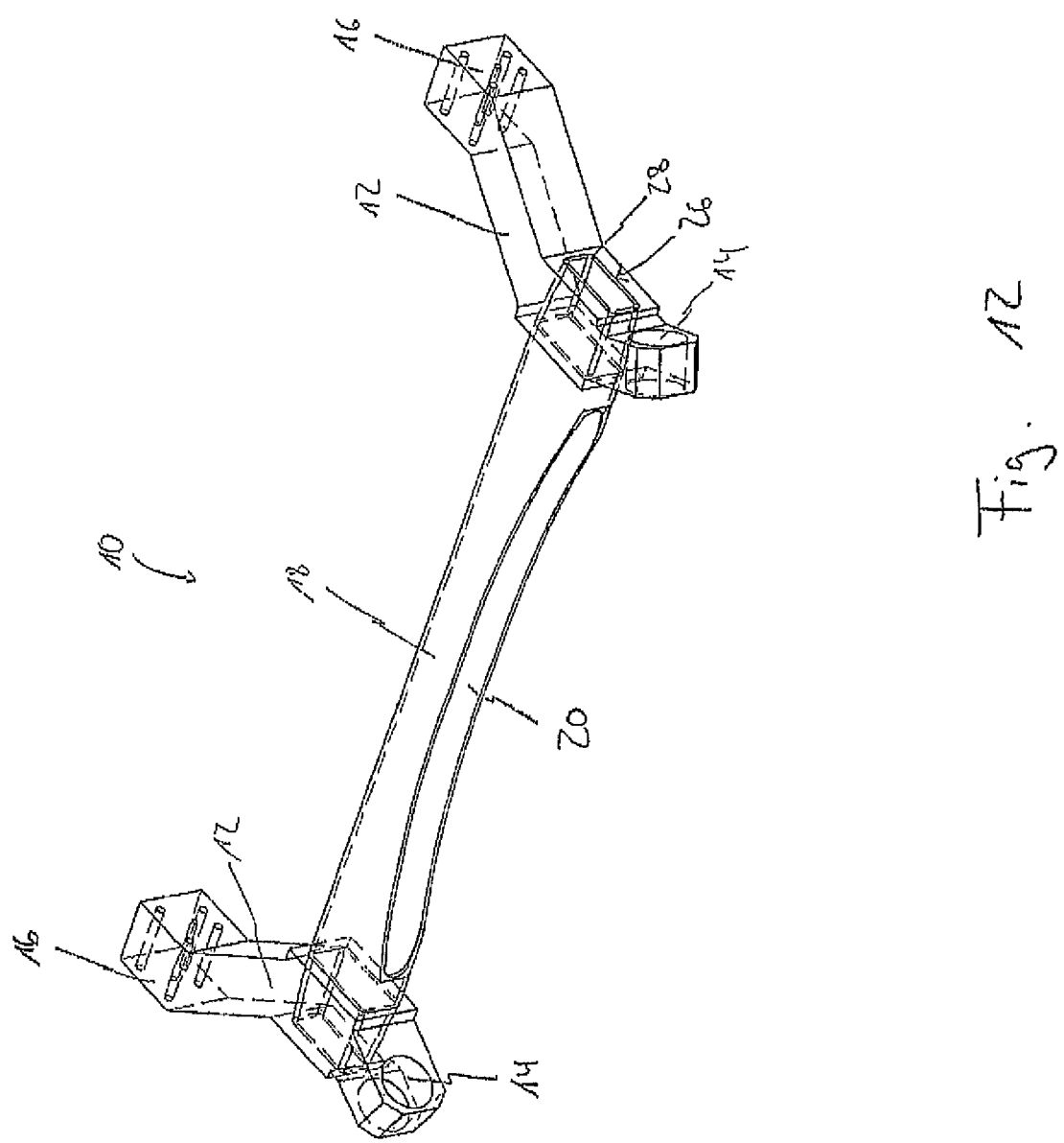
Figure 13:
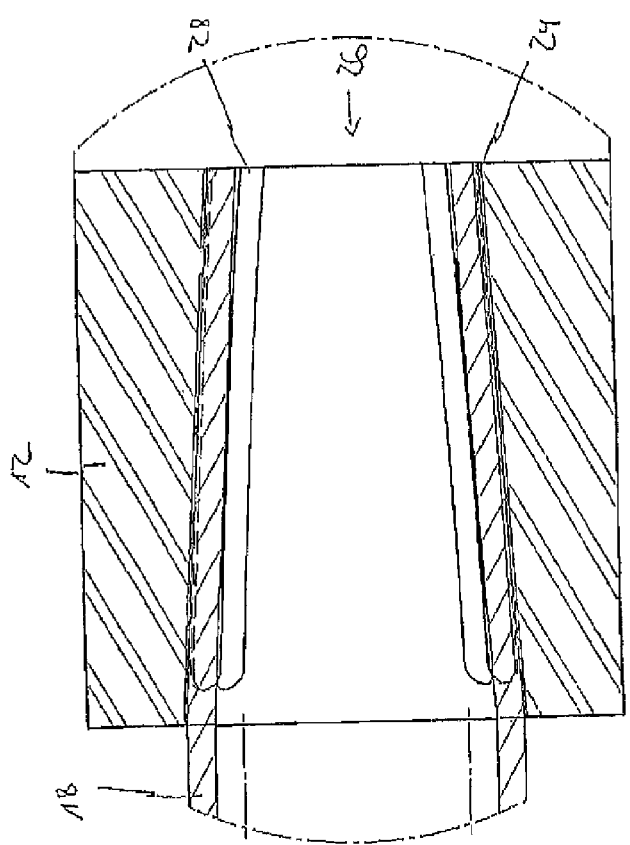
Figure 14:
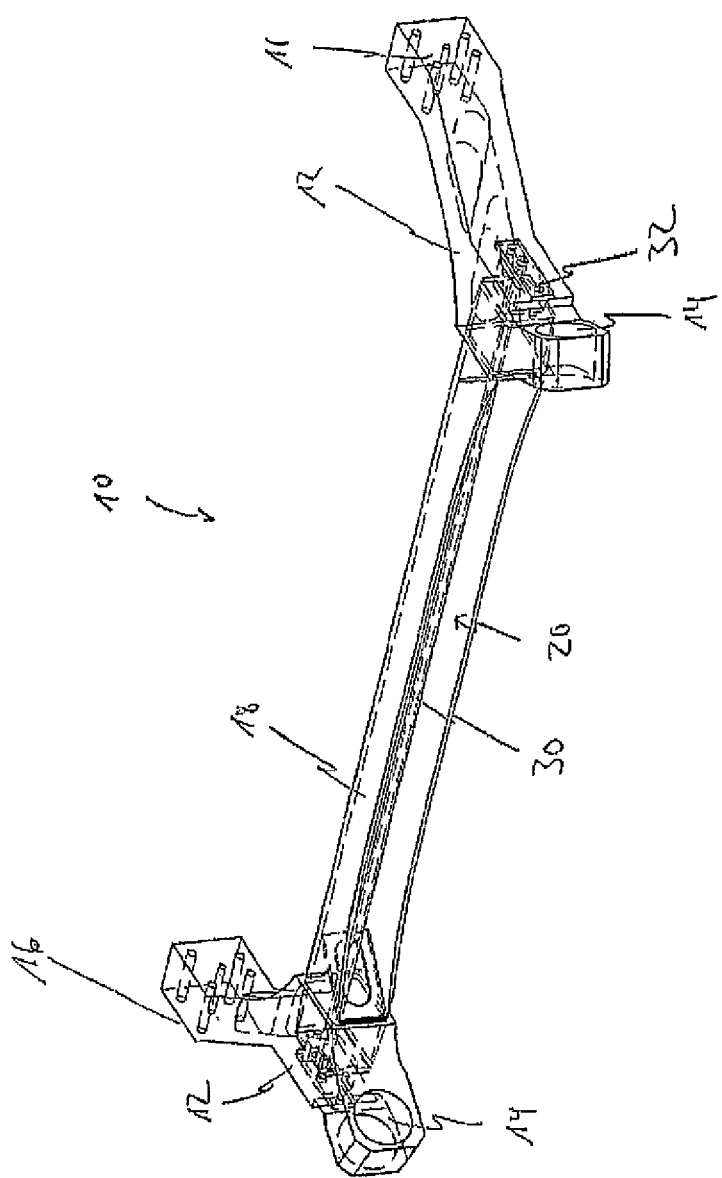
Figure 15:
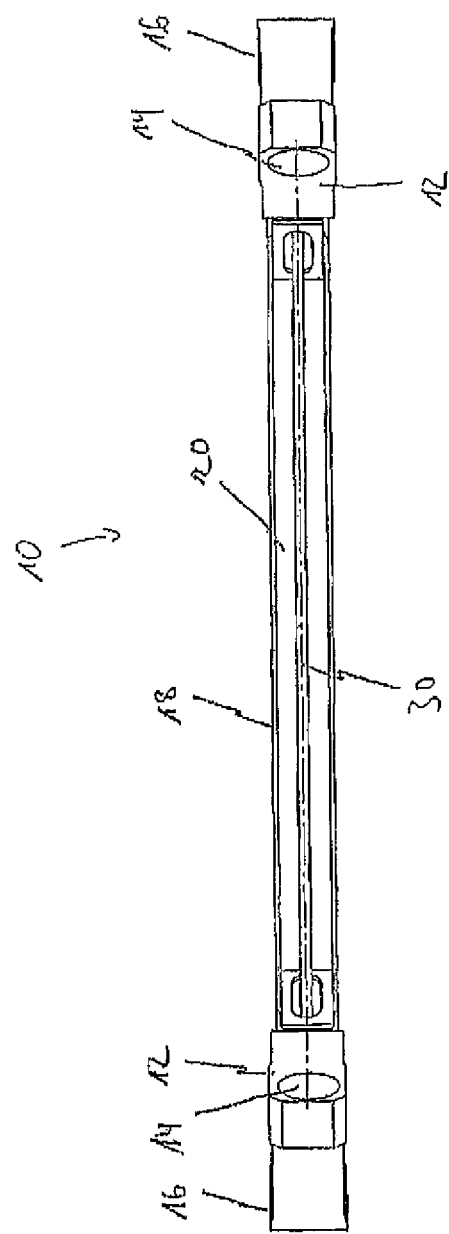

Further advantageous embodiments of the invention are evident from the following description of some exemplary embodiments according to the invention, as well as from the related drawing. This shows:

FIG. 1 a perspective view of an axle module according to the invention,

FIG. 2 a top view of the axle module according to the invention, according to FIG. 1, FIG. 3 a rear view of the axle module according to the invention, according to FIG. 1, FIG. 4 in longitudinal section, a detail view, as a first embodiment of the connection between the end region of an axle body and an accommodation journal, as this can be used in the case of an axle module according to FIGS. 1 to 3, FIG. 5 in longitudinal section, a detail view, as a second embodiment of the connection between the end region of an axle body and an accommodation journal, as this can be used in the case of an axle module according to FIGS. 1 to 3, FIG. 6 in longitudinal section, a detail view, as a third embodiment of the connection between the end region of an axle body and an accommodation journal, as this can be used in the case of an axle module according to FIGS. 1 to 3, FIG. 7 in longitudinal section, a detail view, as a fourth embodiment of the connection between the end region of an axle body and an accommodation journal, as this can be used in the case of an axle module according to FIGS. 1 to 3, FIG. 8 a perspective view of another axle module according to the invention, FIG. 9 in longitudinal section, a detail view, as a fifth embodiment of the connection between the end region of an axle body and an accommodation sleeve, as this can be used in the case of an axle module according to FIG. 8, FIG. 10 a perspective view of another axle module according to the invention, FIG. 11 in longitudinal section, a detail view, as a sixth embodiment of the connection between the end region of an axle body and an accommodation sleeve, as this can be used in the case of an axle module according to FIG. 10, FIG. 12 a perspective view of another axle module according to the invention, FIG. 13 in longitudinal section, a detail view, as a seventh embodiment of the connection between the end region of an axle body and an accommodation sleeve, as this can be used in the case of an axle module according to FIG. 12, FIG. 14 a perspective view of another axle module according to the invention, FIG. 15 a rear view of the axle module according to the invention, according to FIG. 14, and FIG. 16 a sectional view of a detail of the axle module according to the invention, according to FIG. 14.

If the same reference numbers are used in FIGS. 1 to 16, these refer to the same parts, so that for the purpose of avoiding repetition, a component that has already been described will not be discussed again in every figure description.

FIGS. 1 to 3 show, in different views, an axle module 10 in the form of a twist-beam axle for a motor vehicle, consisting of two control arms 12 that can be attached to the vehicle chassis, not shown here, by way of sleeves 14 assigned to one end of the control arm 12, in each instance, carry the wheels of the axle in the region 16, and are connected with one another by way of an axle body 18, whereby the connection between the end region of the axle body 18, in each instance, and the control arm 12, in each instance, is an adhesive connection.

In the present case, the axle body 18 is configured as a hollow profile that is open on one side, at least in part, namely in a region 20 between the end regions of the axle body 18, which profile is also open on the face side, in its end regions, in each instance, but is closed, in tubular manner, over the circumference.

As is already clearly evident from FIG. 1, the axle body 18 has a cross-section that deviates from the circular shape, whereby the cross-section can be designated as being essentially rectangular.

For the production of a connection between the end regions of the axle body 18 configured as a hollow profile and the control arm 12, in each instance, the control arm 12 has an accommodation journal 22 onto which the corresponding end region of the axle body 18 is affixed, in each instance.

After the end regions of the axle body 18 have been affixed to the accommodation journal 20 of the control arm 12, in each instance, a shape-fit connection between axle body 18 and control arm 12 has already been produced, such that the axle body 18 can no longer turn relative to the control arm 12, because of the cross-sectional shape, which deviates from the circular shape, of not only the axle body 18 but also of the accommodation journal 22.

For a representation of the adhesive connection between the accommodation journal 22 and the end region of the axle body 18, reference is now made to FIGS. 4 to 7, which show four embodiment variants as they can be used in the case of an axle module 10 according to FIGS. 1 to 3.

FIG. 4 shows the adhesive connection between an end region of the axle body that widens conically in the direction of the accommodation journal 22 and an accommodation journal 22, which also widens conically, accordingly, in the direction of the control arm 12. Here, the adhesive connection takes place over the full area between the outer mantle of the accommodation journal 22 and the inner mantle of the axle body 18, which is configured to be tubular in this region and is accommodated by the accommodation journal 22. The adhesive 24 is therefore distributed between the stated mantle surfaces and essentially simultaneously forms a spacer or an insulation between axle body 18 or its end regions, and control arm 12 or its accommodation journal 22, in addition to the material-fit connection and seal, so that in this way, for example when using different metallic materials for axle body 18 and control arm 12 or accommodation journal 22, the disadvantageous formation of a galvanic element with corresponding corrosion damage is prevented.

The embodiment shown in FIG. 4 has the advantage that the end regions of the axle body 18 can be pushed onto the accommodation journal 22 or the inner mantle of the end region of the axle body 18 in relatively simple manner after the adhesive has been applied, and sufficiently far onto the accommodation journal. 22, which widens conically, in accordance with the requirements. In this connection, the layer of adhesive 24 can be pressed out relatively broadly, so that an optimized adhesive connection is formed. Furthermore, a relatively large surface area is available, also in correlation with the length of the accommodation journal 22.

The embodiment shown in FIG. 5 essentially corresponds to the embodiment according to FIG. 4. However, in contrast to FIG. 4, a groove that runs around the accommodation journal 22 is introduced into the control arm 12, whereby the groove essentially forms an accommodation sleeve 26 into which a part of the end region of the axle body 18 is introduced.

Thus, here there is a combination of accommodation journal 22 and accommodation sleeve 26, whereby the groove that surrounds the accommodation journal 22, having a predetermined depth, advantageously forms a contact surface for the axle body 18 affixed to the accommodation journal 22 with the end region, in each instance, so that positioning is simplified, in reproducible manner.

If the groove additionally fills with adhesive when the adhesive connection is made, the adhesive advantageously simultaneously represents a sealing agent.

Figure 6:
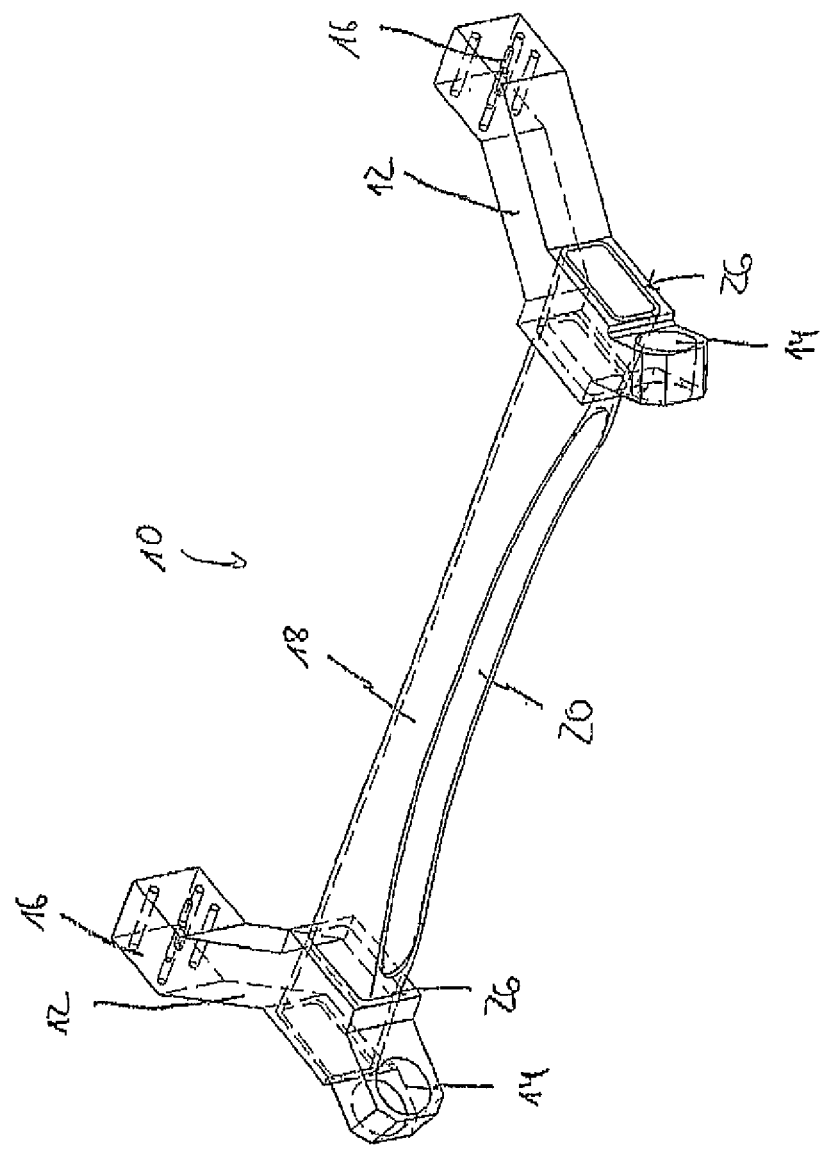

The embodiment shown in FIG. 6, as an alternative to the embodiment according to FIG. 5, shows a geometry of accommodation journal 22 and end region of the axle body 18 that does not widen conically.

Figure 7:
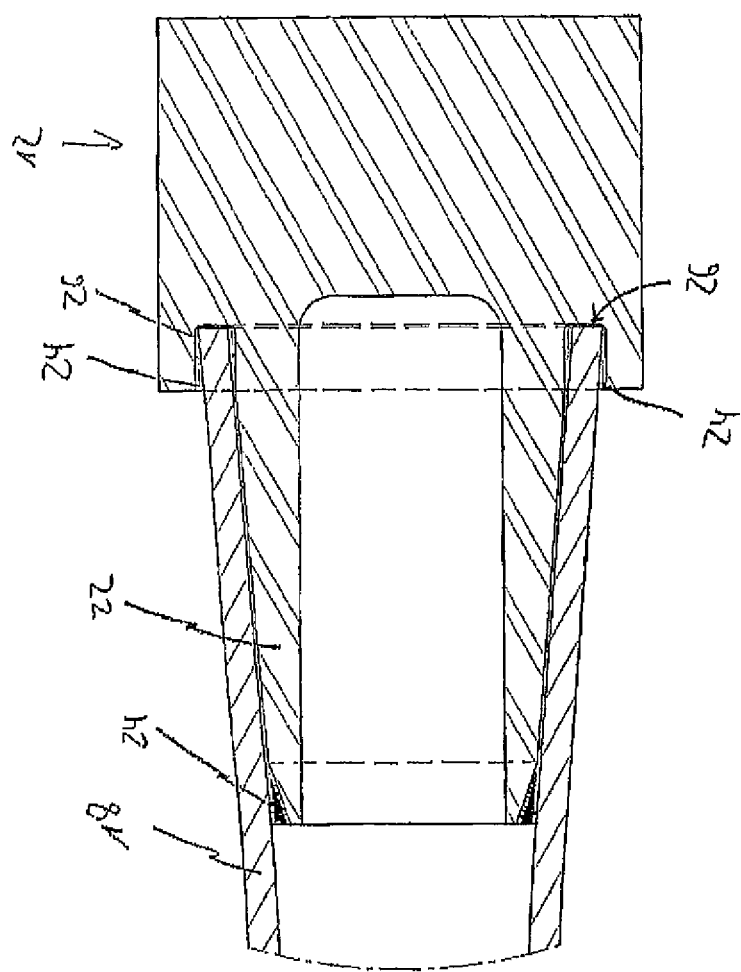

The embodiment shown in FIG. 7, as an alternative to the embodiment according to FIG. 5, shows an accommodation journal 22 that is configured as a hollow profile. Aside from the weight optimization that is achieved as a result, the resilience of such an accommodation journal 22 can also be advantageously utilized for specific applications.

FIG. 8 shows another axle module according to the invention, whereby reference can be made to the description of FIG. 1 for a general description.

For the production of a connection between the end regions of the axle body 18, which is configured as a hollow profile, and the control arm 12, in each instance, the control arm 12 has an accommodation sleeve 26 in the form of a hole open on both sides, into which the corresponding end region of the axle body 18 is introduced, in each instance.

After introduction of the end region of the axle body 18 into the accommodation sleeve 26 of the control arm 12, in each instance, a shape-fit connection between axle body 18 and control arm 12 is produced in that the end region of the axle body 18 is conically widened, in each instance.

For this purpose, the accommodation sleeve 26 is conically widened toward the side of the control arm 12 that faces away from the axle body 18. This is shown in detail in FIG. 9. The adhesive connection is produced between the inner mantle of the accommodation sleeve 26 and the outer mantle of the end region of the axle body 18, which is accommodated by the accommodation sleeve 26, over the full area, whereby the adhesive once again functions as a spacer.

FIG. 10 shows another axle module according to the invention, whereby reference can be made to the description of FIG. 1 for a general description.

For the production of a connection between the end regions of the axle body 18, which is configured as a hollow profile, and the control arm 12, in each instance, the control arm 12 has an accommodation sleeve 26 in the form of a recess that is open on one side, toward the axle body 18, and widens conically, into which the corresponding end region of the axle body 18 is introduced, in each instance.

This is shown in detail in FIG. 11. In order to allow introduction of the end region of the axle body 18 into the accommodation sleeve 26, the end region of the axle body 18 is also conically widened in the aforementioned direction. In the present case, for this purpose the end region of the axle body 18 is machined in material-removing manner, particularly in chip-cutting manner. In this way, tolerances between axle body and control arm, in particular, can be adjusted in practical manner, and a defined adhesive surface can be produced.

FIG. 12 shows another axle module according to the invention, whereby reference can be made to the description of FIG. 1 for a general description.

For the production of a connection between the end regions of the axle body 18, which is configured as a hollow profile, and the control arm 12, in each instance, the control arm 12 has an accommodation sleeve 26 in the form of a hole that is open on both sides and widens conically toward the axle body 18, into which the corresponding end region of the axle body 18, which widens conically in the same direction, is introduced, in each instance.

The connection is shown in detail in FIG. 13. The adhesive connection is produced between the inner mantle of the accommodation sleeve 26 and the outer mantle of the end region of the axle body 18 accommodated by the accommodation sleeve 26, over the full area, whereby once again, the adhesive functions as a spacer. Longitudinal slits 28 are introduced in the end regions, here preferably in the corner regions of the axle body 18, which slits allow or facilitate joining of axle body 18 and control arm 12, because the end region of the axle body 18 deforms in accordance with the conicity of the accommodation sleeve 26 during joining. With a counter-tool that is introduced from the other side, into the accommodation sleeve 26, and presses the surfaces of the end region of the axle body 18 from the inside, it is possible to achieve a reliable adhesive connection between axle body 18 and control arm 12.

FIGS. 14 to 16 show another axle module according to the invention, whereby reference can be made to the description of FIG. 1 for a general description. The adhesive connection is produced between the inner mantle of the accommodation sleeve 26 and the outer mantle of the end region of the axle body 18, which is accommodated by the accommodation sleeve 26, over the full area, whereby the adhesive once again functions as a spacer.

The axle module 10 shown in FIGS. 14 to 16 advantageously has a connection element 30 within the axle body 18, preferably in the form of a tube or a rod, which is screwed to the control arm 12, in each instance, on its end regions, by means of screws 32, in such a manner that the connection element 30 acts as a tie rod that connects the two control arms 12. With such a tie rod, it is not only possible to adjust the torsion rigidity of the axle body 18, but also to achieve simplified positioning of the axle body 18 relative to the control arms 12, which leads to an optimized adhesive connection.

The invention claimed is:
1. Axle module for a motor vehicle, the axle module comprising a first control and a second control arm, which can be attached to the vehicle chassis, carry the wheels of the axle, and are connected with one another by way of an axle body, wherein the connection between the axle body and the first control arm is a first adhesive connection and the connection between the axle body and the second control arm is a second adhesive connection, wherein each of the first control arm and the second control arm has for the axle body an accommodation provision in a form of an accommodation journal and a groove, the groove enclosing the accommodation journal and being disposed in the control arm.

2. Axle module according to claim 1, wherein the axle body is connected with the first control arm with shape fit and with the second control arm with shape fit.

3. Axle module according to claim 1, wherein the axle body is connected with the first control arm with force fit and with the second control arm with force fit.

4. Axle module according to claim 1, wherein the axle body is connected with the first control arm via screwing, riveting, clamping, pressing, crimping and/or clinching and with the second control arm via screwing, riveting, clamping, pressing, crimping and/or clinching.

5. Axle module according to claim 1, wherein the connection regions or connection surfaces on the axle body, on the first control arm, and/or on the second control arm are machined.

6. Axle module according to claim 1, wherein the axle body is produced from a different material than the first and second control arms.

7. Axle module according to claim 1, wherein the first control arm and the second control arm are produced in part from a light material.

8. Axle module according to claim 7, wherein the light material is a light metal, a plastic, or a composite of light metal and plastic.

9. Axle module according to claim 8, wherein the light metal comprises aluminum, magnesium, zinc, or alloys with one or more of these metals.

10. Axle module according to claim 8, wherein the plastic is a fiberglass-reinforced polyamide.

11. Axle module according to claim 1, wherein the axle module is produced from steel or iron.

12. Axle module according to claim 1, wherein each of the first and second control arms has an accommodation sleeve for the axle body.

13. Axle module according to claim 12, wherein the accommodation sleeve and/or the accommodation journal have a cross-sectional shape that deviates from the circular shape, at least in part.

14. Axle module according to claim 13, wherein the accommodation sleeve and/or the accommodation journal are configured to be essentially rectangular, square, oval, triangular, polygonal and/or trapezoid in cross-section.

15. Axle module according to claim 12, wherein the first adhesive connection is produced, at least in part, between the inner mantle of the accommodation sleeve and the outer mantle of the axle body accommodated by the accommodation sleeve.

16. Axle module according to claim 15, wherein the first adhesive connection is produced between the inner mantle of the accommodation sleeve and the outer mantle of the axle body, which is accommodated in the accommodation sleeve, over the full area.

17. Axle module according to claim 12, wherein the first adhesive connection is produced, at least in part, between the outer mantle of the accommodation journal and the inner mantle of the axle body, the inner mantle being configured to be tubular at least in this region, and is accommodated in the accommodation journal.

18. Axle module according to claim 17, wherein the first adhesive connection is produced between the outer mantle of the accommodation journal and the inner mantle of the axle body, which is configured to be tubular, at least in this region, and is accommodated in the accommodation journal, over the full area.

19. Axle module according to claim 12, wherein the first control arm is configured in one piece with the accommodation sleeve and/or the accommodation journal.

20. Axle module according to claim 12, wherein the accommodation sleeve and/or the accommodation journal are configured in one or multiple parts.

21. Axle module according to claim 12, wherein at least a part of the accommodation sleeve and/or the accommodation journal is configured to be tubular, bucket-shaped, pot-shaped, bell-shaped, or conical.

22. Axle module according to claim 12, wherein the accommodation sleeve and/or the accommodation journal is integrated into the first control arm, at least in part, or formed by the first control arm.

23. Axle module according to claim 12, wherein the first control arm is produced as a component cast in one piece with the accommodation sleeve and/or the accommodation journal such that a cast component is formed.

24. Axle module according to claim 23, wherein the accommodation sleeve and/or the accommodation journal is a part produced separately from casting the first control arm and is cast into the first control arm, at least in part.

25. Axle module according to claim 23, wherein at least a part of the accommodation sleeve and/or the accommodation journal or the cast component is produced via squeeze casting, counter-pressure ingot mold casting (CPC), thixocasting, rheocasting, low-pressure sand casting, or gravity ingot mold casting.

26. Axle module according to claim 23, wherein at least a part of the accommodation sleeve and/or the accommodation journal or the cast component is produced using the injection-molding method.

27. Axle module according to claim 12, wherein the accommodation sleeve and/or the accommodation journal for the axle body is adapted to the outer and/or inner contour of the axle body.

28. Axle module according to claim 12, wherein the first control arm or the accommodation sleeve and/or the accommodation journal and/or the axle body are configured, at least in part, as an injection-molded, extruded, continuously cast or cast profile.

29. Axle module according to claim 1, wherein the first adhesive connection is such that the adhesive acts as a spacer between the first control arm and the axle body.

30. Axle module according to claim 1, wherein the axle body is disposed on the vehicle chassis at the level of the connection for attachment of the first control arm.

31. Axle module for a motor vehicle, the axle module comprising a first control and a second control arm, which can be attached to the vehicle chassis, carry the wheels of the axle, and are connected with one another by way of an axle body, wherein the connection between the axle body and the first control arm is a first adhesive connection and the connection between the axle body and the second control arm is a second adhesive connection, wherein a connection element is disposed within the axle body over the length of the axle body, has a first end region and a second end region, is connected with the first control arm via the first end region to form a first connection element connection with the axle body, and is connected with the second control arm via the second end region to form a second connection element connection with the axle body, wherein the first connection element connection is different from the first adhesive connection and from the second adhesive connection, and wherein the second connection element connection is different from the first adhesive connection and from the second adhesive connection.

32. Axle module according to claim 31, wherein the connection element is connected with the first and second control arms in such a manner that the connection element acts as a tie rod that connects the first and second control arms.

33. Axle module for a motor vehicle, the axle module comprising a first control and a second control arm, which can be attached to the vehicle chassis, carry the wheels of the axle, and are connected with one another by way of an axle body, wherein the connection between the axle body and the first control arm is a first adhesive connection and the connection between the axle body and the second control arm is a second adhesive connection, and wherein each of the first and second control arms has an accommodation provision in a form of an accommodation sleeve, the accommodation sleeve having a circumference and being at least partly open over the circumference.

* * * * *